Aug. 23, 1938.   G. R. WYMAN   2,127,578
GASKET HOLDER
Filed May 2, 1936
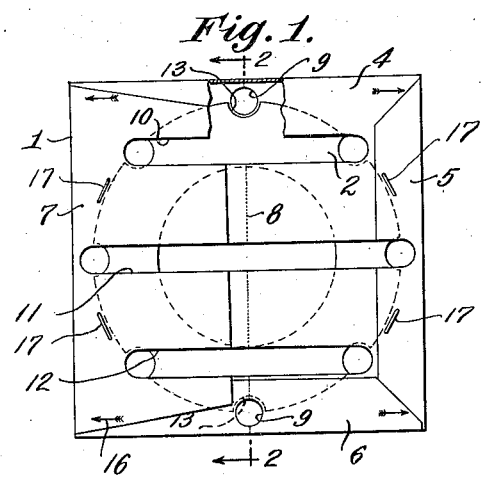
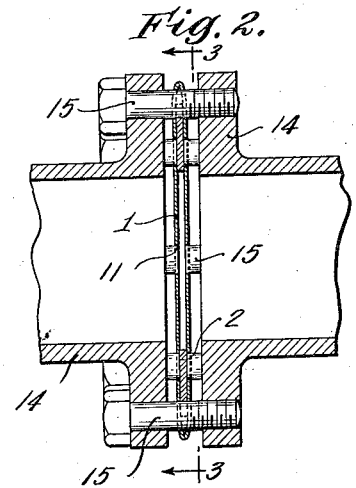
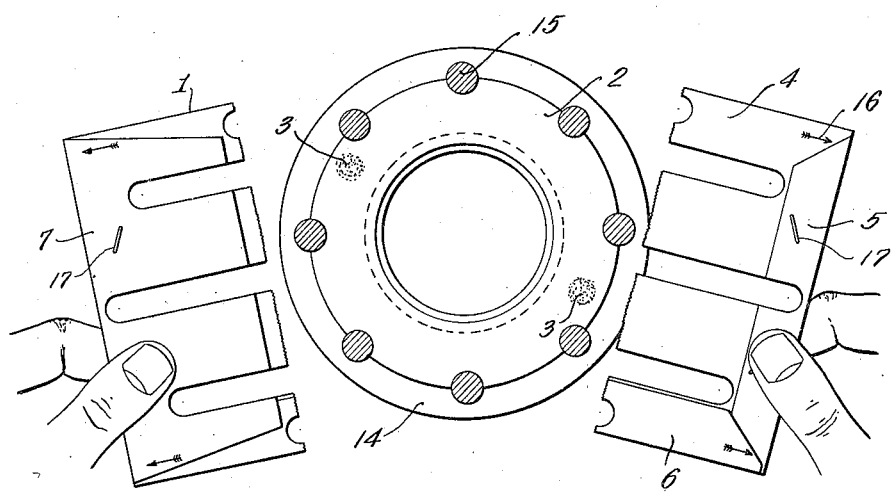
Inventor,
George Russell Wyman,
by Roberts, Cushman & Woodberry
Attys.

Patented Aug. 23, 1938

2,127,578

UNITED STATES PATENT OFFICE 2,127,578

GASKET HOLDER

George Russell Wyman, East Walpole, Mass.

Application May 2, 1936, Serial No. 77,507

7 Claims. (Cl. 206—46)

This invention relates to a holder for positioning a gasket between the opposed ends of a pipe coupling, especially a coupling of the type having flanges interconnected by bolts, and more particularly to a holder for use in replacing a gasket in a pipe line already installed, where the opposed ends of the coupling can be forced apart only a short distance and where it is therefore difficult to insert the new gasket in the restricted space, to center it in the coupling and to hold it in centered position while the coupling is being tightened.

Objects of the present invention are to provide a holder which is simple and economical to construct, which protects the gasket during the course of shipment and storage, which permits inspection of the gasket without removal from the holder, which is adapted to insert a gasket in a restricted space between opposed ends of a pipe coupling, which facilitates centering the gasket coaxially with the coupling, and which can readily be removed from the gasket and from the restricted space while leaving the gasket in centered position.

According to this invention portions of the holder extend beyond opposite sides of the periphery of the coupling when the gasket is centered between the ends, a portion of the gasket being exposed for maintaining it coaxial with the coupling when the holder is removed, and said portions being separable from the gasket in response to pulling forces on said portions to remove the holder while leaving the gasket in said coaxial position. In the preferred form each of said portions is detachably interconnected with the gasket, as by small spots of lightly adhering cement, and the two portions are connected with each other at a weakened line along which the two portions readily tear apart in response to said pulling forces. For use with pipe couplings of the aforesaid type the preferred method of maintaining the gasket in centered position while the holder is being removed involves the provision of recesses in the gasket to receive two or more of the coupling bolts and the location of the aforesaid weakened line at said recesses, whereby the gasket is maintained in position by the bolts while the holder is being removed by tearing it apart along the weakened line. When the aforesaid portions are connected together as aforesaid the holder may be in the form of a sheet of paper or other suitable material, preferably a sheet folded and cemented in the form of an envelope. While the holder may be shaped in various ways preferably it is rectangular with its length and width both equal to the outside diameter of the coupling so that it may be quickly centered merely by holding its four edges tangential to the periphery of the coupling. In its preferred form the envelope has at least two bolt openings respectively registering with the aforesaid recesses in the gasket, and also slots extending transversely of said weakened line.

For the purpose of illustration a typical embodiment of the invention is illustrated in the accompanying drawing, in which, Fig. 1 is a face view of an envelope containing a gasket, portions of the envelope being broken away;

Fig. 2 is an axial section of a pipe coupling showing the envelope and gasket in section on line 2—2 of Fig. 1; and Fig. 3 is a section on line 3—3 of Fig. 2 after the two portions of the envelope have been torn apart.

The particular embodiment of the invention chosen for the purpose of illustration comprises a square envelope 1 containing a gasket 2 which is held in centered position within the envelope by means of two spots of cement 3 of the type which permits the envelope and gasket to be pulled apart without distorting the gasket. While the envelope may be formed in various ways, as illustrated in the drawing it comprises a square section of paper having flaps on its four sides which are folded over the gasket in overlapping relationship with each other and cemented together. As shown in Fig. 1 the flap 4 at the top, which is substantially as long as the envelope so as to extend almost to the lower edge, is folded over first, the narrow flap 5 at the right is then folded over and cemented to the flap 4, the narrow flap 6 at the bottom is next folded over and cemented to the flaps 4 and 5 and the flap 7 at the left, which extends almost half way across the envelope, is finally folded over and cemented to the flaps 4 and 6.

Before the paper is folded into the form of an envelope it is scored along the line 8 to provide a weakened line extending all the way across both sides of the finished envelope, that is, across the front of the envelope and thence along the full length of each of the flaps 4 and 6. Before the envelope is folded sections are also cut out so that when the paper is folded into the form of an envelope the bolt openings 9 and slots 10, 11 and 12 extend all the way through the finished envelope. The gasket 2 is provided with recesses 13, two of which register with the bolt openings 9 and two of which define, with the ends of the slot 11, openings for two other bolts in the horizontal central plane of the envelope. Obviously any desired number of recesses and bolt openings may be provided depending upon the particular construction of the coupling to which the gasket is to be applied. For example, recesses may be formed in the gasket at the ends of the slots 10 and 12 which, together with the curved ends of these slots, define four more bolt openings intermediate the four above referred to. Before the flaps are folded over the gasket the latter is placed in the position shown in Fig. 1 and lightly cemented to the inside face of the front of the envelope at the spots 3.

To apply the gasket between the opposed ends of a coupling of the type having flanges 14 secured together by bolts 15, the bolts are removed, the opposed ends of the couplings are pried apart, the old gasket is removed, the envelope 1 is inserted into the space between the ends of the coupling with the gasket coaxial with the pipe line and the bolt openings in the envelope registering with the bolt openings in the pipe coupling, the bolts are replaced but not tightened, the envelope is torn apart as illustrated in Fig. 3 leaving the gasket supported by the bolts, and the bolts are then tightened. By extending the weakened line transversely of the slots 10, 11 and 12 through one pair of recesses 13 and providing right-angle slots to accommodate the other bolts, the two portions of the envelope are free to be removed as soon as the envelope is torn along the weakened line 8. Inasmuch as the slots and weakened line are not readily visible after the envelope is placed between the ends of the coupling arrows 16 are preferably provided in the corners of the envelope to indicate which way to tear the envelope apart.

While the gasket is shown as lightly attached to the envelope by cement it may be held in position without attachment. One means to this end is illustrated in the drawing in the form of staples 17 clinched through the envelope at suitable points adjacent and parallel to the outer periphery of the gasket, whereby the gasket is held in fixed position in the envelope without interfering with the removal of the two halves of the envelope as illustrated in Fig. 3. The staples 17 not only center the gasket in the envelope but, by virtue of the pinching action of the envelope in the region of the staples, they hold the gasket against rotation.

In the absence of the recesses in the gasket the outside diameter of the gasket would of course be reduced to the diametrical distance between opposite bolts and before tearing away the envelope at least through bolts, spaced less than 180° apart, should be inserted to maintain the gasket in centered position.

It should be understood that the present disclosure is for the purpose of illustration only and that this invention includes all modifications and equivalents which fall within the scope of the appended claims.

I claim:

1. A holder for positioning a gasket between the opposed ends of a pipe coupling, characterized by portions extending beyond opposite sides of the periphery of the coupling when the gasket is placed between said ends, a portion of the gasket being exposed for engagement with the coupling to maintain it coaxial with the coupling when the holder is removed, and said portions being detachably interconnected so as to be separable from the gasket in response to pulling forces on said portions to remove the holder while leaving the gasket in the space between said ends.

2. A holder for positioning a gasket between the opposed ends of a pipe coupling, comprising a sheet of material detachably connected to one side of the gasket and projecting beyond opposite sides of the periphery of the gasket and having bolt openings, said sheet having a weakened line intermediate the projecting portions, so that by gripping said portions the gasket may be positioned between said ends and the sheet may then be separated along said line and removed from the space between the pipe ends.

3. A holder for positioning a gasket between the opposed ends of a pipe coupling, comprising an envelope having bolt openings and having a diagonal dimension greater than the outside diameter of the coupling and having a weakened line along which it may be separated by pulling on the projecting corners, thereby to remove the envelope in two parts after the gasket has been positioned between the said ends.

4. A holder for positioning a gasket between the opposed ends of a pipe coupling of the type having flanges interconnected by two diametrically opposed bolts, the holder comprising an envelope having bolt openings and having a diagonal dimension greater than the outside diameter of the coupling and having a weakened line in the plane of said bolts so that, after the gasket has been properly positioned in engagement with said bolts, the envelope may be removed in two parts by pulling on the projecting corners to tear it along said line.

5. A holder for positioning a gasket between the opposed ends of a pipe coupling, comprising an envelope having bolt openings and having a length and width approximating the outside diameter of the coupling and having a weakened line along which it may be separated by pulling on the projecting corners, thereby to remove the envelope in two parts after the gasket has been positioned between the said ends.

6. A holder for positioning a gasket between the opposed ends of a pipe coupling of the type having flanges interconnected by two diametrically opposed bolts, the holder comprising an envelope having bolt openings and having a length and width approximating the outside diameter of the coupling and having a weakened line in the plane of said bolts so that, after the gasket has been properly positioned in engagement with said bolts, the envelope may be removed in two parts by pulling on the projecting corners to tear it along said line.

7. The combination with a gasket of an envelope for positioning the gasket between the opposed ends of a pipe coupling of the type having flanges interconnected by two diametrically opposed bolts, the gasket having recesses in its periphery to receive said bolts and the envelope having bolt openings registering with said recess and having a weakened line in the plane of said openings so that, after the gasket has been positioned with its recesses in engagement with said bolts, the envelope may be removed in two parts by pulling on the projecting portions to tear it along said line.

GEORGE RUSSELL WYMAN.